United States Patent
Boden et al.

(10) Patent No.: US 9,334,765 B2
(45) Date of Patent: May 10, 2016

(54) ENGINE OIL SYSTEM

(71) Applicant: VOLVO CAR CORPORATION, Gothenburg (SE)

(72) Inventors: Roger Boden, Kungsbacka (SE); Ulf Jonason, Gothenburg (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/316,374

(22) Filed: Jun. 26, 2014

(65) Prior Publication Data
US 2015/0000629 A1  Jan. 1, 2015

(30) Foreign Application Priority Data

Jun. 27, 2013 (EP) .................................. 13173999

(51) Int. Cl.
*F01M 11/03* (2006.01)
*F01M 1/02* (2006.01)
*F01M 5/00* (2006.01)
*F01M 5/02* (2006.01)
*F01M 1/10* (2006.01)
*F01M 11/02* (2006.01)
*F16N 39/00* (2006.01)
*B01D 35/18* (2006.01)
*F01M 11/04* (2006.01)

(52) U.S. Cl.
CPC . *F01M 1/02* (2013.01); *F01M 1/10* (2013.01); *F01M 5/002* (2013.01); *F01M 5/005* (2013.01); *F01M 5/02* (2013.01); *F01M 11/02* (2013.01); *B01D 35/18* (2013.01); *F01M 11/03* (2013.01); *F01M 11/0458* (2013.01); *F16N 39/005* (2013.01)

(58) Field of Classification Search
CPC ........ F16N 39/005; F01M 11/03; F01M 1/10; F01M 11/0458; B01D 35/18

USPC ...................................................... 123/196 A
See application file for complete search history.

(56) References Cited

U.S. PATENT DOCUMENTS

| 5,887,562 A | * | 3/1999 | von Esebeck et al. .. 123/196 AB |
| 2011/0042329 A1 | * | 2/2011 | Hacker et al. ................. 210/806 |
| 2012/0048228 A1 | | 3/2012 | Chung |

FOREIGN PATENT DOCUMENTS

| DE | 102006013867 A1 | 9/2007 |
| DE | 102008032496 A1 | 1/2010 |
| FR | 2925576 A3 | 6/2009 |

OTHER PUBLICATIONS

Extended European Search Report Dated Sep. 26, 2013, Application No. 13173999.7-1603, Applicant Volvo Car Corporation, 5 Pages.

* cited by examiner

*Primary Examiner* — Lindsay Low
*Assistant Examiner* — Charles Brauch
(74) *Attorney, Agent, or Firm* — Brooks Kushman P.C.

(57) ABSTRACT

An engine oil system according to the disclosure comprises an oil pump connected to an oil sump, an oil cooler connected to the oil pump and an oil filter. The oil filter is connected to an engine. The engine oil system further comprises a first by-pass conduit connected to the oil pump and which is arranged to be connected to a component of the engine oil system other than the oil cooler. The first by-pass conduit comprises a first by-pass valve, wherein, in a first mode, the first by-pass valve is in an open state allowing oil to by-pass the oil cooler, and wherein, in a second mode, the first by-pass valve is in a closed state directing the oil through the oil cooler. The disclosure also relates to a vehicle comprising an engine oil system.

21 Claims, 4 Drawing Sheets

ENGINE OIL SYSTEM

CROSS-REFERENCE TO RELATED APPLICATIONS

This application claims foreign priority benefits under 35 U.S.C. §119(a)-(d) to European patent application number EP 13173999.7, filed Jun. 27, 2013 which is incorporated by reference in its entirety.

TECHNICAL FIELD

The disclosure relates to an engine oil system. The engine oil system comprises an oil pump connected to an oil sump, an oil cooler connected to the oil pump and an oil filter. The oil filter is connected to the engine.

BACKGROUND

Plug-in hybrid electric vehicles which combine an electric engine and an internal combustion engine are known in the art. During operation of a plug-in hybrid electric vehicle the internal combustion engine is used intermittently as the vehicle may run only on the electric engine. This causes the internal combustion engine to remain stationary for periods of time. During high performance manoeuvres such as overtaking another vehicle the internal combustion engine starts in order to provide extra power during the manoeuvre. As the internal combustion engine has not been used for some time the internal combustion engine is not properly lubricated when needed and is thus prone to excess wear during high performance manoeuvres. The same problem arises when an internal combustion engine is cold started as it takes time for the cold oil in the engine oil system to properly lubricate the engine.

There is thus a need for an improved engine oil system which addresses this problem.

SUMMARY

An object of the present disclosure is to provide an engine oil system where the previously mentioned problems are partly avoided.

The disclosure relates to an engine oil system. The engine oil system comprises an oil pump connected to an oil sump, an oil cooler connected to the oil pump and an oil filter. The oil filter is connected to the engine. The engine oil system further comprises a first by-pass conduit connected to the oil pump which is arranged to be connected to a component of the engine oil system other than the oil cooler. The first by-pass conduit comprises a first by-pass valve, where in a first mode the first by-pass valve is in an open state allowing oil to by-pass the oil cooler, and where in a second mode the first by-pass valve is in a closed state directing the oil through the oil cooler.

Components of the oil system may be the engine, the oil pump, the oil sump, the oil cooler and the oil filter. The present disclosure may also be used for components other than these in an engine oil system. A first component arranged to be connected to a second component means that the first component is connected directly to the second component or connected to the second component via an intermediate component.

By using an engine oil system according to the disclosure it is possible to decrease the time needed to reach a desired oil pressure in the internal combustion engine during for instance high performance manoeuvres. The time to reach desired oil pressure is hereinafter referred to as time-to-oil-pressure. The first by-pass conduit works with all types of internal combustion engines.

The possibility to by-pass some components, such as the oil cooler, is highly desirable since the oil cooler as well as some other components delay the time-to-oil-pressure due to that there is a large pressure drop when the oil passes the oil cooler. Allowing for bypassing of components such as the engine oil cooler leads to a quicker lubrication of the engine.

The first by-pass conduit can be integrated in a component in the engine oil system, such as a channel in the oil sump. The first by-pass conduit may alternatively be a channel detached from any component in the engine oil system. The first by-pass conduit may alternatively be placed between the inlet and the outlet of the oil cooler. A stray flux over the valve may be allowable as this reduces the need for detailed machining of the first by-pass valve and first by-pass conduit.

The component to which the first by-pass conduit is connected to may be the oil filter. The component to which the first by-pass conduit is connected to may be the engine.

The engine oil system allows for the first by-pass conduit to connect to any desirable part of the engine oil system, for instance the oil filter or directly to the engine in order to reach the desired time-to-oil-pressure for a certain engine configuration by bypassing more or fewer components of the engine oil system.

The state of the first by-pass valve may be determined by one or more of:
  the temperature of the oil,
  the pressure in the engine oil system,
  elapsed time after start of the engine,
  the torque output of the engine,
  the revolutions per minute of the engine,
  ambient temperature,
  the temperature of the cooling water,
  the effect requested by the engine.

The state of the first by-pass valve, i.e., if the valve is in an open state or a closed state may be determined by control conditions such as the temperature of the oil, the pressure in the engine oil system, the elapsed time after start of the engine, the torque output of the engine, the revolutions per minute of the engine, ambient temperature, the temperature of the cooling water and/or the effect requested by the engine. This allows for different control scenarios which may be either determined by the driver by choosing one or more of the control conditions or by that the vehicle's engine control unit selects one or more control conditions depending on the preconditions of the engine. It may for instance be suitable to have different control conditions determining the state of the first by-pass valve for cold starts and for high performance manoeuvres.

The first by-pass valve may be an on-off valve. The opening and closing time of the first by-pass valve may each be between 0 and 600 seconds, specifically between 0 and 120 seconds.

Although a control valve may be used which may be set to a certain positions, it is desirable to have an on-off valve as the first by-pass valve. The opening and closing times of the first by-pass valve are chosen such that the system does not experience any pressure surges which may damage components in the engine oil system. The time to open and close the first by-pass valve may be longer than 600 seconds if desirable.

The engine oil system may further comprise a second by-pass conduit comprising a second by-pass valve. The second by-pass conduit may be connected to the oil pump and to the engine, where the second by-pass valve in a third mode is in an open state allowing oil to by-pass the oil cooler and where the second by-pass valve in a fourth mode is in a closed state directing the oil through the oil cooler.

By having an engine oil system with a second by-pass conduit connected to the engine it is possible to by-pass oil past both the oil cooler and a second component of the engine oil system, such as for instance the oil filter. This has the advantage that time-to-oil-pressure can be further reduced.

The state of the second by-pass valve may be determined by one or more of:
the temperature of the oil,
the pressure in the engine oil system,
elapsed time after start of the engine,
the torque output of the engine,
the revolutions per minute of the engine,
ambient temperature,
the temperature of the cooling water,
the effect requested by the engine.

The second by-pass valve may be an on-off valve.

The opening and closing time of the second by-pass valve are between 0 and 600 seconds, specifically between 0 and 120 seconds.

The second by-pass valve shares the same characteristics and exhibits the same advantages as described above for the first by-pass valve. The first and second by-pass valves may be controlled by the same parameters or by different parameters. The first and second by-pass valves may have the same opening and closing times or different opening and closing times. As mentioned, that which is valid for the first by-pass conduit and first by-pass valve is also valid for the second by-pass conduit and second by-pass valve although they may not necessarily be identical when both are used. For instance if the first by-pass conduit is placed in one of the components of the engine oil system, the second by-pass conduit may be placed in the same component or a different component or the second by-pass conduit may be a channel detached from any component of the engine oil system.

The disclosure further relates to a vehicle comprising an engine oil system according to the disclosure.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
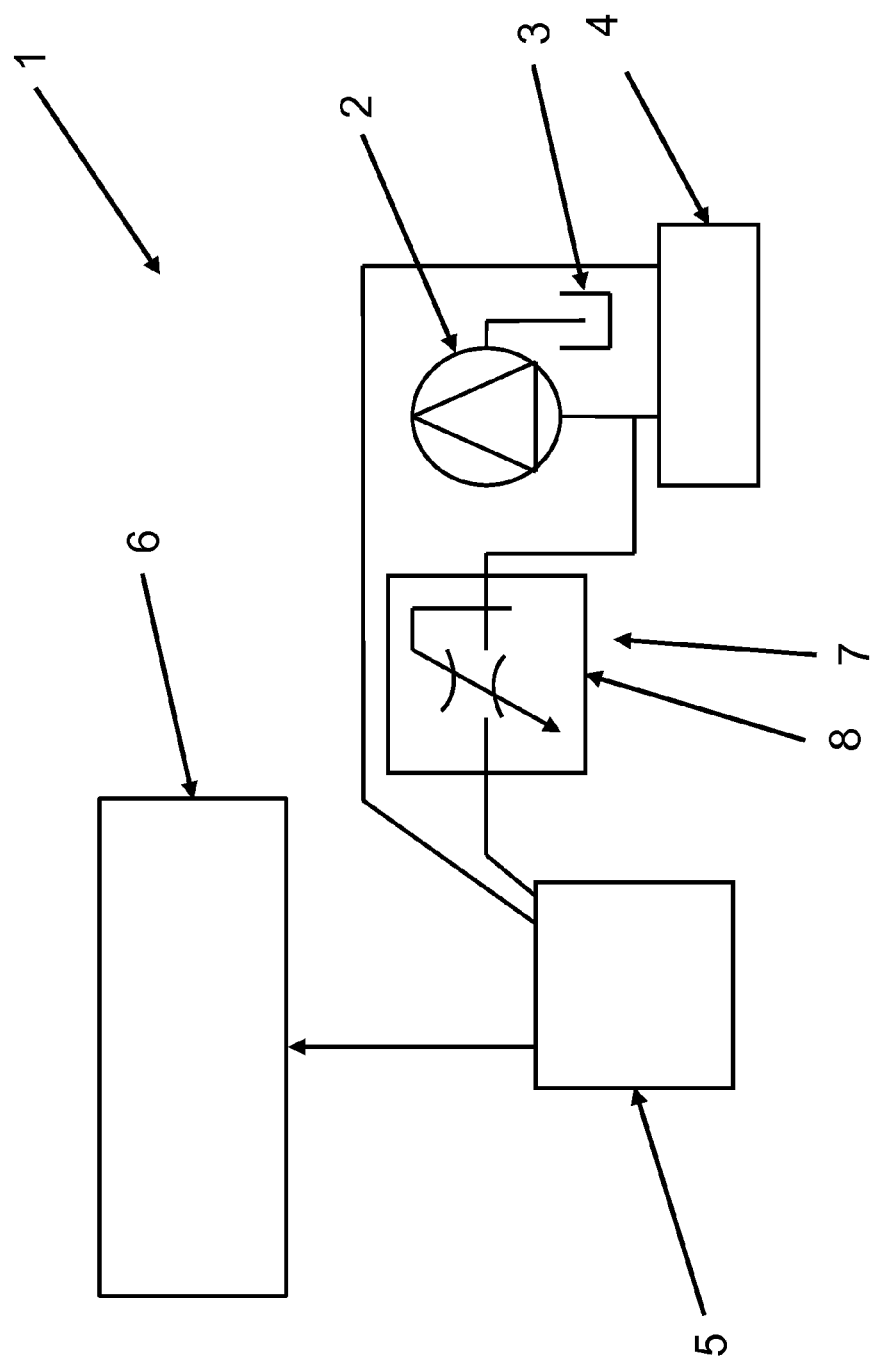
FIG. 1 schematically shows an engine oil system according to the disclosure.

FIG. 1 schematically shows an engine oil system 1 according to the disclosure. The engine oil system 1 comprises an oil pump 2 connected to an oil sump 3, an oil cooler 4 connected to the oil pump 2 and an oil filter 5 where the oil filter 5 is connected to a combustion engine 6. The engine oil system 1 further comprises a first by-pass conduit 7 arranged to be connected to a component of the engine oil system 1 other than the oil cooler 4. The first by-pass conduit 7 comprises a first by-pass valve 8 which can adopt two states, an open state and a closed state. In FIG. 1 the first by-pass valve 8 is in a closed state.

Figure 2:
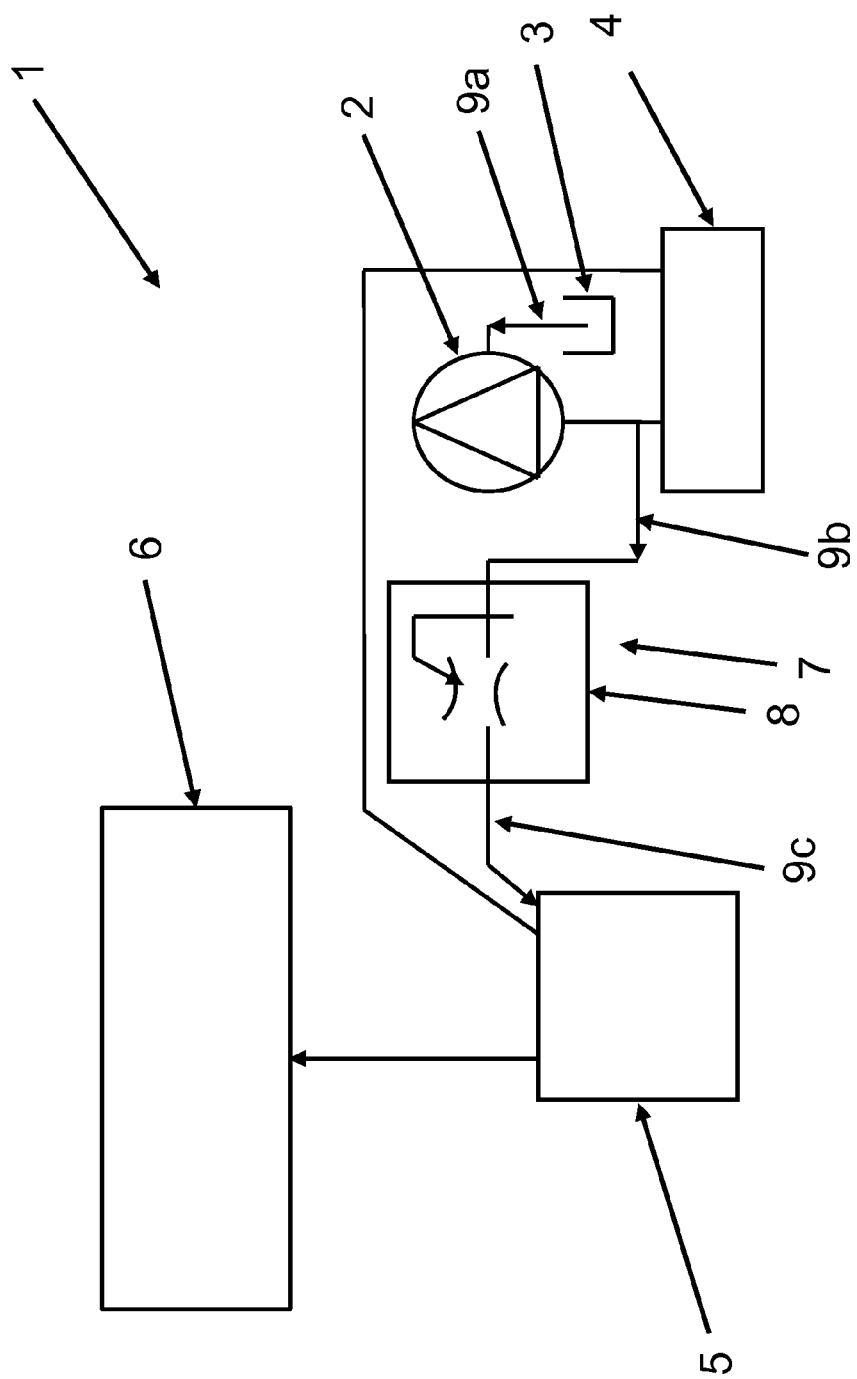
FIG. 2 schematically shows an engine oil system according to the disclosure in a first mode.

FIG. 2 schematically shows an engine oil system 1 according to the disclosure in a first mode. In the first mode the first by-pass valve 8 is in an open state. In FIG. 2 the first by-pass conduit 7 is connected to the oil pump 2 and the oil filter 5 by-passing the oil cooler 4 allowing oil to by-pass the oil cooler 4 before the oil enters the oil filter 5 and further to the combustion engine 6. The flow of the oil through the engine oil system 1 is indicated by the arrows 9a, 9b, 9c. Alternatively, the first by-pass conduit 7 may be connected to the oil pump 2 and the combustion engine 6 directly allowing oil to by-pass both the oil cooler 4 and the oil filter 5.

Figure 3:
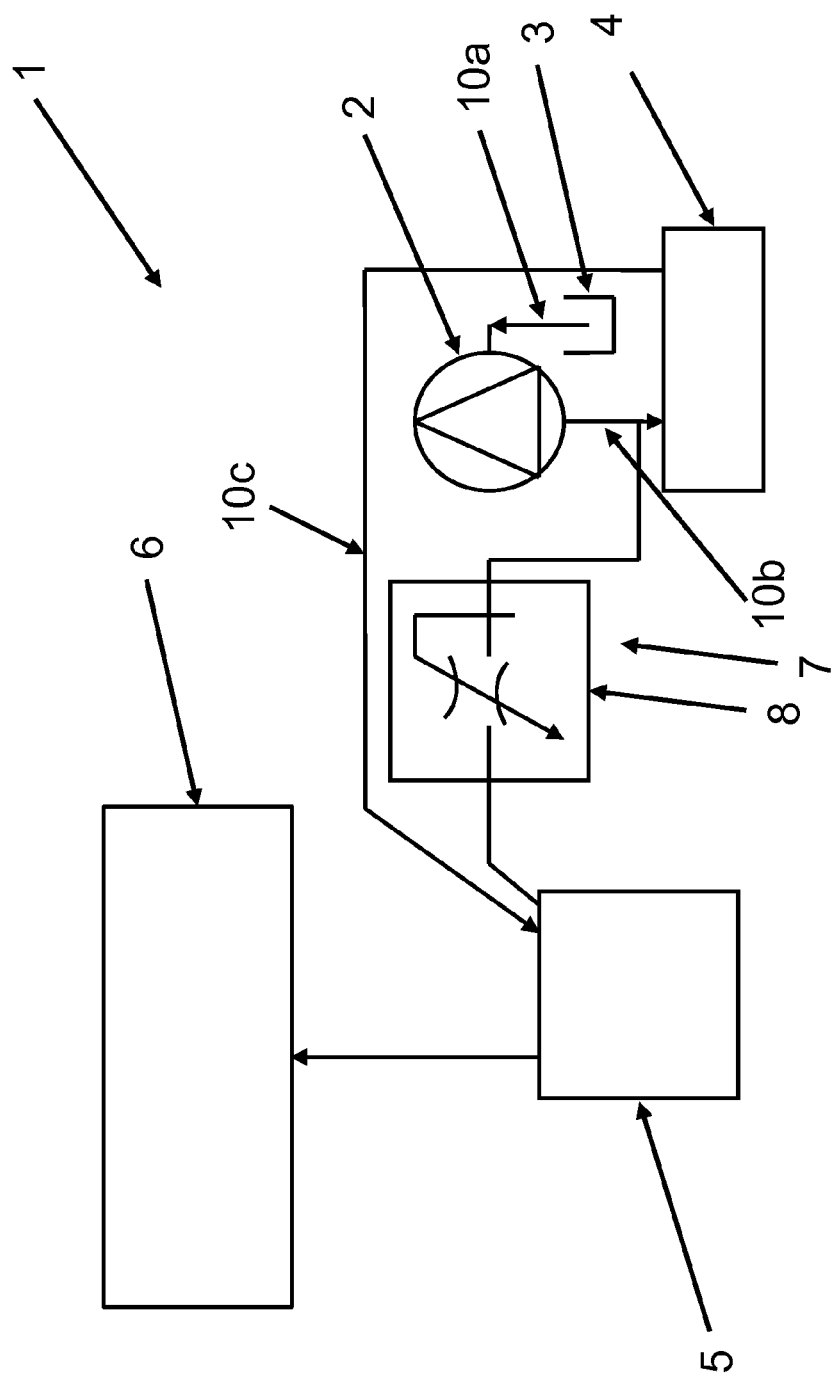
FIG. 3 schematically shows an engine oil system according to the disclosure in a second mode.

FIG. 3 schematically shows an engine oil system 1 according to the disclosure in a second mode. In the second mode the first by-pass valve 8 is in a closed state. The oil thus passes through the oil cooler 4 before the oil enters the oil filter 5 and further to the combustion engine 6. This is indicated in FIG. 3 by the arrows 10a, 10b, 10c. Alternatively, when the first by-pass conduit 7 is connected to the oil pump 2 and the combustion engine 6 the oil passes through the oil cooler 4 before the oil enters the oil filter 5 and further to the combustion engine 6.

One example of a mode of operation according to the disclosure is the following. The first-by pass valve 8 is initially open. Coolant fluid in the combustion engine 6 heats the oil present in the oil cooler 4 while the oil pump 2 via the first by-pass conduit 7 leads oil past the oil cooler 4 and directly to the oil filter 5 or the combustion engine 6. This leads to that the viscosity of the oil in the oil cooler 4 is reduced as the temperature of the oil increases while at the same time the time-to-oil-pressure is reduced as the oil cooler 4 is by-passed. When one or more control conditions have been met, the first by-pass valve 8 closes, thus leading the oil from the oil pump 2 through the oil cooler 4.

Figure 4:
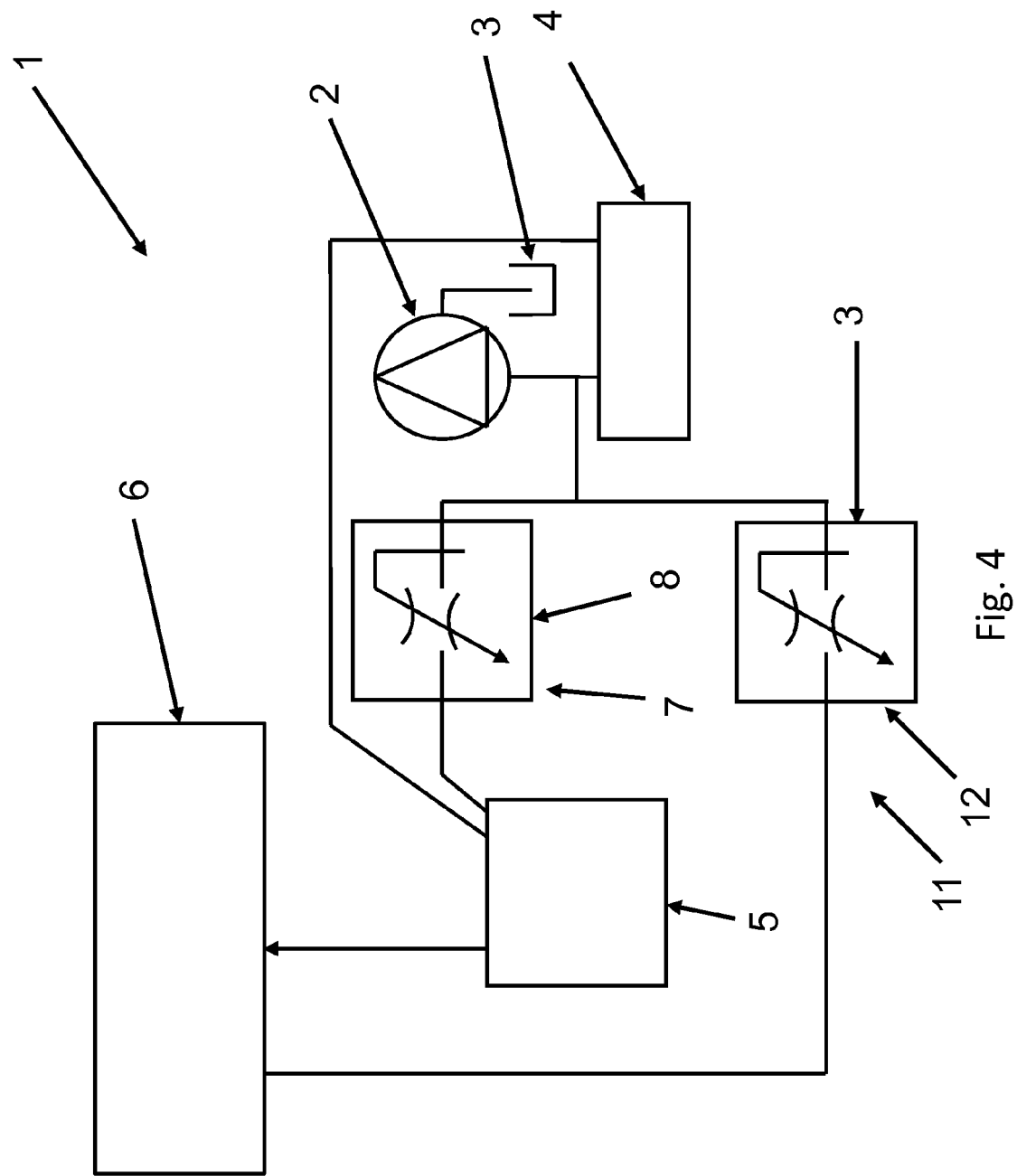
FIG. 4 schematically shows an engine oil system according to a second embodiment of the disclosure.

FIG. 4 schematically shows an engine oil system 1 according to a second embodiment of the disclosure. In FIG. 4 the engine oil system 1 comprises a second by-pass conduit 11 comprising a second by-pass valve 12 connected to the oil pump 2 and to the combustion engine 6 by-passing both the oil cooler 4 and oil filter 5. The second by-pass valve 12 can adopt two states, an open state and a closed state. This can be seen as a combination of the two alternatives described above.

The opening and closing time of the first by-pass valve 8 and the second by-pass valve 12 are chosen such that pressure surges in the engine oil system 1 are avoided. The first and second by-pass valves 8, 12 can be a thermostat controlled valve, a valve controlled by an electrical actuator, a stepper motor controlled valve or a vacuum opening/closing valve.

The disclosure is applicable to vehicles provided with either a diesel or petrol engine. As the combustion engine can be used in any kind of hybrid vehicle comprising a combustion engine, this application of the disclosure is also possible. The greatest effect of the disclosure can be found in hybrid vehicles although any vehicle with a combustion engine will benefit from the effects described above.

Reference signs mentioned in the claims should not be seen as limiting the extent of the matter protected by the claims, and their sole function is to make claims easier to understand.

As will be realized, the invention is capable of modification in various obvious respects, all without departing from the scope of the appended claims. Accordingly, the drawings and the description are to be regarded as illustrative in nature, and not restrictive. Additionally, the features of various implementing embodiments may be combined to form further embodiments of the invention.

What is claimed is:

1. An engine oil system comprising:
   an engine;
   an oil pump connected to an oil sump;
   an oil filter connected to the engine;
   an oil cooler connected to the oil pump and the oil filter;
   a first by-pass conduit connected to the oil pump and the oil filter, the first by-pass conduit comprising a first by-pass valve, wherein, in a first mode, the first by-pass valve is configured to be in an open state for allowing oil to by-pass the oil cooler and pass through the oil filter before flowing to the engine, and wherein, in a second mode, the first by-pass valve is configured to be in a closed state for causing the oil to be directed through the oil cooler; and
   a second by-pass conduit comprising a second by-pass valve, the second by-pass conduit being connected to the oil pump and to the engine, wherein the second by-pass valve in a third mode is configured to be in an open state for allowing oil to by-pass the oil cooler, and wherein the second by-pass valve in a fourth mode is configured to be in a closed state for causing the oil to be directed through the oil cooler;
   wherein the first by-pass conduit is configured to allow the oil to by-pass the oil cooler without passing through the second by-pass valve, and the second by-pass conduit is configured to allow the oil to by-pass the oil cooler without passing through the first by-pass valve, and wherein at least one of the first and second by-pass valves is configured to be controlled by a thermostat or an electric actuator.

2. The engine oil system according to claim 1 wherein the state of the first by-pass valve is determinable based on one or more of:
   temperature of the oil,
   pressure in the engine oil system,
   elapsed time after start of the engine,
   torque output of the engine,
   revolutions per minute of the engine,
   ambient temperature,
   temperature of cooling water,
   effect requested by the engine.

3. The engine oil system according to claim 1 wherein the first by-pass valve is an on-off valve.

4. The engine oil system according to claim 3 wherein opening and closing times of the first by-pass valve are each between 0 and 600 seconds.

5. The engine oil system according to claim 4 wherein the opening and closing times of the first by-pass valve are each between 0 and 120 seconds.

6. The engine oil system according to claim 1 wherein the state of the second by-pass valve is determinable based on one or more of:
   temperature of the oil,
   pressure in the engine oil system,
   elapsed time after start of the engine,
   torque output of the engine,
   revolutions per minute of the engine,
   ambient temperature,
   temperature of cooling water,
   effect requested by the engine.

7. The engine oil system according to claim 1 wherein the second by-pass valve is an on-off valve.

8. The engine oil system according to claim 7 wherein opening and closing times of the second by-pass valve are each between 0 and 600 seconds.

9. The engine oil system according to claim 8 wherein the opening and closing times of the second by-pass valve are each between 0 and 120 seconds.

10. A vehicle comprising the engine oil system according to claim 1.

11. An engine oil system comprising:
    an oil pump connectable to an oil sump;
    an oil filter connectable to an engine;
    an oil cooler connectable to the oil pump and the oil filter;
    a first by-pass conduit connectable to the oil pump and the oil filter, the first by-pass conduit comprising a first by-pass valve, wherein, in a first mode, the first by-pass valve is configured to be in an open state for allowing oil to by-pass the oil cooler and pass through the oil filter before flowing to the engine, and wherein, in a second mode, the first by-pass valve is configured to be in a closed state for causing the oil to be directed through the oil cooler; and
    a second by-pass conduit comprising a second by-pass valve, the second by-pass conduit being connectable to the oil pump and to the engine, wherein the second by-pass valve in a third mode is configured to be in an open state for allowing oil to by-pass the oil cooler, and wherein the second by-pass valve in a fourth mode is configured to be in a closed state for causing the oil to be directed through the oil cooler;
    wherein, when the second by-pass valve is in the closed state, the first by-pass conduit is configured to allow the oil to by-pass the oil cooler without passing through the second by-pass valve, and, when the first by-pass valve is in the closed state, the second by-pass conduit is configured to allow the oil to by-pass the oil cooler without passing through the first by-pass valve.

12. An engine oil system comprising:
    an engine;
    an oil pump connected to an oil sump;
    an oil filter connected to the engine;
    an oil cooler connected to the oil pump and the oil filter;
    a first by-pass conduit connected to the oil pump and comprising a first by-pass valve, wherein, in a first mode, the first by-pass valve is configured to be in an open state for allowing oil to by-pass the oil cooler, and wherein, in a second mode, the first by-pass valve is configured to be in a closed state for causing the oil to be directed through the oil cooler; and
    a second by-pass conduit connected to the oil pump and comprising a second by-pass valve, wherein, in a third mode, the second by-pass valve is configured to be in an open state for allowing the oil to by-pass the oil cooler, and wherein, in a fourth mode, the second by-pass valve is configured to be in a closed state for causing the oil to be directed through the oil cooler;
    wherein, when the second by-pass valve is in the closed state, the first by-pass conduit is configured to allow the oil to by-pass the oil cooler without passing through the second by-pass valve, and, when the first by-pass valve is in the closed state, the second by-pass conduit is configured to allow the oil to by-pass the oil cooler without passing through the first by-pass valve.

13. The engine oil system according to claim 12 wherein the first by-pass conduit is connected to the oil filter on an upstream side of the oil filter such that the oil is allowed to pass through the oil filter when the first by-pass valve is in the open state.

14. The engine oil system according to claim 13 wherein the second by-pass conduit is connected to the engine such that the oil is allowed to by-pass the oil filter and flow to the engine when the second by-pass valve is in the open state.

15. The engine oil system according to claim 12 wherein the second by-pass conduit is connected to the engine such that the oil is allowed to by-pass the oil filter when the second by-pass valve is in the open state.

16. The engine oil system according to claim 1 wherein the first by-pass conduit and the second by-pass conduit are each connected to the oil pump upstream of the oil cooler.

17. The engine oil system according to claim 11 wherein the first by-pass conduit and the second by-pass conduit are each connectable to the oil pump upstream of the oil cooler, and wherein the first by-pass conduit is configured to allow the oil to by-pass the oil cooler without passing through the second by-pass valve, and the second by-pass conduit is configured to allow the oil to by-pass the oil cooler without passing through the first by-pass valve.

18. The engine oil system of claim 1 wherein the at least one of the first and second by-pass valves is configured to be controlled by a stepper motor.

19. The engine oil system of claim 12 wherein at least one of the first and second by-pass valves is configured to be controlled by a thermostat.

20. The engine oil system of claim 12 wherein at least one of the first and second by-pass valves is configured to be controlled by an electrical actuator.

21. The engine oil system of claim 12 wherein at least one of the first and second by-pass valves is configured to be controlled by a stepper motor.

* * * * *